(12) United States Patent
Kidakarn

(10) Patent No.: US 10,766,610 B2
(45) Date of Patent: Sep. 8, 2020

(54) UNMANNED AERIAL VEHICLE WITH PROPELLER GUARD

(71) Applicant: Mattel, Inc., El Segundo, CA (US)

(72) Inventor: Mac Kidakarn, Harbor City, CA (US)

(73) Assignee: Mattel, Inc., El Segundo, CA (US)

( * ) Notice: Subject to any disclaimer, the term of this patent is extended or adjusted under 35 U.S.C. 154(b) by 346 days.

(21) Appl. No.: 15/876,266

(22) Filed: Jan. 22, 2018

(65) Prior Publication Data

US 2019/0225327 A1 Jul. 25, 2019

(51) Int. Cl.
| | |
|---|---|
| *B64C 27/00* | (2006.01) |
| *B64C 39/02* | (2006.01) |
| *G08G 5/00* | (2006.01) |

(52) U.S. Cl.
CPC .......... *B64C 27/006* (2013.01); *B64C 39/024* (2013.01); *B64C 2201/108* (2013.01); *G08G 5/0069* (2013.01)

(58) Field of Classification Search
CPC .......................... B64C 2201/025; B64C 27/006
USPC ........................................................ 244/17.11
See application file for complete search history.

(56) References Cited

U.S. PATENT DOCUMENTS

| | | | |
|---|---|---|---|
| 2,938,298 A | 5/1960 | Apostolescu | |
| 8,147,289 B1 | 4/2012 | Lee | |
| 8,328,130 B2 | 12/2012 | Goossen | |
| 9,550,400 B2 | 1/2017 | Hutson | |
| 2002/0104921 A1 | 8/2002 | Louvel | |
| 2007/0215750 A1 | 9/2007 | Shantz | |
| 2010/0224723 A1 | 9/2010 | Apkarian | |
| 2013/0206915 A1 | 8/2013 | Desaulniers | |
| 2014/0323009 A1 | 10/2014 | Suzuki | |
| 2015/0321759 A1 | 11/2015 | Caubel | |
| 2015/0360776 A1 | 12/2015 | Briod | |
| 2016/0122015 A1 | 5/2016 | Hutson | |
| 2016/0137293 A1 | 5/2016 | Santangelo | |
| 2016/0200415 A1 | 7/2016 | Cooper | |
| 2016/0221671 A1 | 8/2016 | Fisher | |
| 2016/0229530 A1 | 8/2016 | Welsh | |
| 2016/0229534 A1 | 8/2016 | Hutson | |
| 2016/0280359 A1 | 9/2016 | Semke | |
| 2016/0368596 A1 | 12/2016 | Zhang | |
| 2016/0378108 A1 | 12/2016 | Paczan | |
| 2017/0029101 A1 | 2/2017 | Weissenberg | |
| 2017/0043869 A1 | 2/2017 | Howard | |
| 2017/0152060 A1 | 6/2017 | Morisawa | |
| 2018/0155018 A1* | 6/2018 | Kovac | ................ B64C 29/0016 |
| 2019/0009893 A1* | 1/2019 | Toyama | ................ B64D 45/00 |

* cited by examiner

*Primary Examiner* — Claude J Brown
(74) *Attorney, Agent, or Firm* — Edell, Shapiro & Finnan, LLC

(57) ABSTRACT

An unmanned aerial vehicle comprising a rotor having one or more propeller blades and a propeller guard surrounding the rotor. The propeller guard comprises a main guard surrounding the one or more propeller blades and a movable guard vertically displaced from the main guard. The movable guard is movable from a default position to an engaged position by temporarily deforming the movable guard such that the movable guard contacts and obstructs rotation of the one or more propeller blades.

20 Claims, 16 Drawing Sheets

UNMANNED AERIAL VEHICLE WITH PROPELLER GUARD

FIELD OF THE INVENTION

The present invention relates generally to unmanned aerial vehicles (UAV), and in particular toy aerial vehicles. More specifically, the present invention relates to unmanned aerial vehicles having a propeller guard that protects users from contact with its rotating propeller blades.

BACKGROUND OF THE INVENTION

Unmanned aerial vehicles (UAVs) typically rely on one or more spinning rotors for lift and thrust. As the rotor spins, air flows through its rotating blades to generate the necessary lift and thrust to respectively counteract the gravitational force and aerodynamic drag on the UAV. By controlling the speed and rotation of the rotor, the UAV can be controlled to hover and fly in the air.

In order to generate sufficient air flow, the rotor of a UAV typically spins at high speeds. Therefore, direct contact with the rotating blades of the rotor can be dangerous for a user, as well as potentially cause damage to the blades and other parts of the rotor. However, a user, especially a younger or inexperienced user, may still be inclined to grab onto the rotor or a portion of the rotor while the UAV is in flight due to the prominence and/or position of the rotor in relation to the rest of the UAV body. Thus, a need exists for a UAV having a propeller guard that limits direct contact with its rotating propeller blades and more specifically, reduces harm or injury that may occur from contacting its rotating propeller blades.

SUMMARY OF THE INVENTION

The present invention provides an unmanned aerial vehicle (UAV) having a propeller guard that helps protect a user from potential harm or injury that may occur from contacting its rotating propeller blades. The propeller guard is structured in a way that limits direct contact with the rotating propeller blades. In particular, a movable guard section of the propeller guard is positioned between the user and the propeller blades. When sufficient pressure is applied on the propeller guard (such as when the propeller guard is grabbed or held onto), the movable guard comes into contact with the propeller blades. Continued pressure from the user onto the movable guard is translated to the propeller blades, which are subsequently stopped from further rotation by the movable guard. This safety feature significantly reduces injuries that may occur when a user comes into contact with the UAV while its rotor is spinning at high speeds.

According to one aspect of the present invention, an unmanned aerial vehicle is provided. The unmanned aerial vehicle comprises a rotor having one or more propeller blades and a propeller guard surrounding the rotor. The propeller guard comprises a main guard surrounding the one or more propeller blades and a movable guard vertically displaced from the main guard. The movable guard is movable from a default position to an engaged position where a section of the movable guard intersects a plane defined by the main guard. Moving the movable guard from the default position to the engaged position results in the movable guard contacting and obstructing rotation of the one or more propeller blades. The movable guard returns to the default position when not in the engaged position. In some embodiments, the movable guard further includes a loop that contacts the main guard when the movable guard is moved from the default position to the engaged position.

In one or more embodiments, the propeller guard further comprises an ancillary guard vertically displaced from the main guard and positioned on a side of the main guard opposite from the position of the movable guard. In some embodiments, at least one of the main guard, movable guard, and ancillary guard is a ring structure or a section of a ring structure. In certain instances, the main guard and movable guard are concentric sections of ring structures and the length of the propeller blade is less than the radius of the main guard and greater than the radius of the movable guard. In a further instance, the ancillary guard is a ring structure or a section of a ring structure having a radius less than the radius of the main guard.

In one or more embodiments, the movable guard is supported by a linkage connected to a body of the unmanned aerial vehicle. Typically, at least one of the movable guard and linkage is made of a flexible and/or pliable material, such that moving the movable guard to the engaged position comprises temporarily deforming at least one of the movable guard and linkage (for example, bending at least a portion of the movable guard or linkage). In some of these embodiments, the linkage connects the movable guard to the main guard and a support beam connects the main guard to the body of the unmanned aerial vehicle. In one instance, two or more linkages connect the movable guard to the main guard. In other embodiments, the linkage directly connects the movable guard to the body of the unmanned aerial vehicle.

In one or more embodiments, the main guard is substantially parallel to a plane of rotation of the one or more propeller blades. Furthermore, in some of these embodiments, the movable guard is also substantially parallel to the main guard when in the default position.

In one or more embodiments, the unmanned aerial vehicle comprises a plurality of rotors and propeller guards. In some of these embodiments, the unmanned aerial vehicle further comprises a stall system that stops rotation of all the rotors when one or more of the propeller guards obstructs rotation of a respective rotor.

According to another aspect of the present invention, a toy aerial vehicle is provided. The toy aerial vehicle comprises a rotor having one or more propeller blades and a propeller guard surrounding the rotor. The propeller guard comprises a main guard surrounding the one or more propeller blades and a movable guard vertically displaced from the main guard. The movable guard is supported by a linkage connected to a body of the toy aerial vehicle. The movable guard is also movable from a default position to an engaged position by temporarily deforming at least one of the movable guard and linkage such that the movable guard contacts and obstructs rotation of the one or more propeller blades. The default position of the movable guard allows the one or more propeller blades to rotate and the movable guard remains in and/or returns to the default position when not in the engaged position.

In one or more embodiments, the toy aerial vehicle further comprises an ancillary guard vertically displaced from the main guard and positioned on a side of the main guard opposite from the position of the movable guard. In certain embodiments, the main guard, movable guard, and ancillary guard are concentric sections of ring structures.

According to a further aspect of the present invention, a method of protecting a user from contact with a rotating propeller blade is provided. The method comprises providing an unmanned aerial vehicle comprising a rotor having one or more propeller blades and providing a propeller guard surrounding the rotor. The propeller guard comprises a main guard surrounding the one or more propeller blades and a movable guard vertically displaced from the main guard. The movable guard is supported by a linkage connected to a body of the unmanned aerial vehicle. The movable guard is also movable from a default position to an engaged position by temporarily deforming at least one of the movable guard and linkage. The one or more propeller blades freely rotate when the movable guard is in the default position. The movable guard contacts and obstructs rotation of the one or more propeller blades when in the engaged position.

Other objects, features and advantages of the present invention will become apparent to those skilled in the art from the following detailed description. It is to be understood, however, that the detailed description and specific examples, while indicating some embodiments of the invention, are given by way of illustration and not limitation. Many changes and modifications within the scope of the invention may be made without departing from the spirit thereof, and the present invention includes all such modifications.

BRIEF DESCRIPTION OF THE DRAWINGS

Referring now to the drawings in which like reference numbers represent corresponding parts throughout:

FIG. 8A illustrates a top perspective view of a portion of the UAV. FIG. 8B illustrates a top perspective view of a plurality of movable guards. FIG. 8C illustrates a top perspective view of the portion of the UAV including the plurality of movable guards;

DETAILED DESCRIPTION OF THE INVENTION

An unmanned aerial vehicle (UAV) according to the present invention includes a propeller guard that limits direct contact with its rotating propeller blades and more specifically, reduces harm or injury that may occur from contacting its rotating propeller blades. Grabbing and/or holding onto the propeller guard with sufficient pressure while the UAV is in mid-flight or airborne (or anytime the propellers are moving) causes a movable guard of the propeller guard to come into contact with the rotating propeller blades, instead of the user's hand contacting the blades. This contact may further stop the propeller blades from rotating, which ensures that the propeller blades do not injure or hurt the user.

Figure 1:
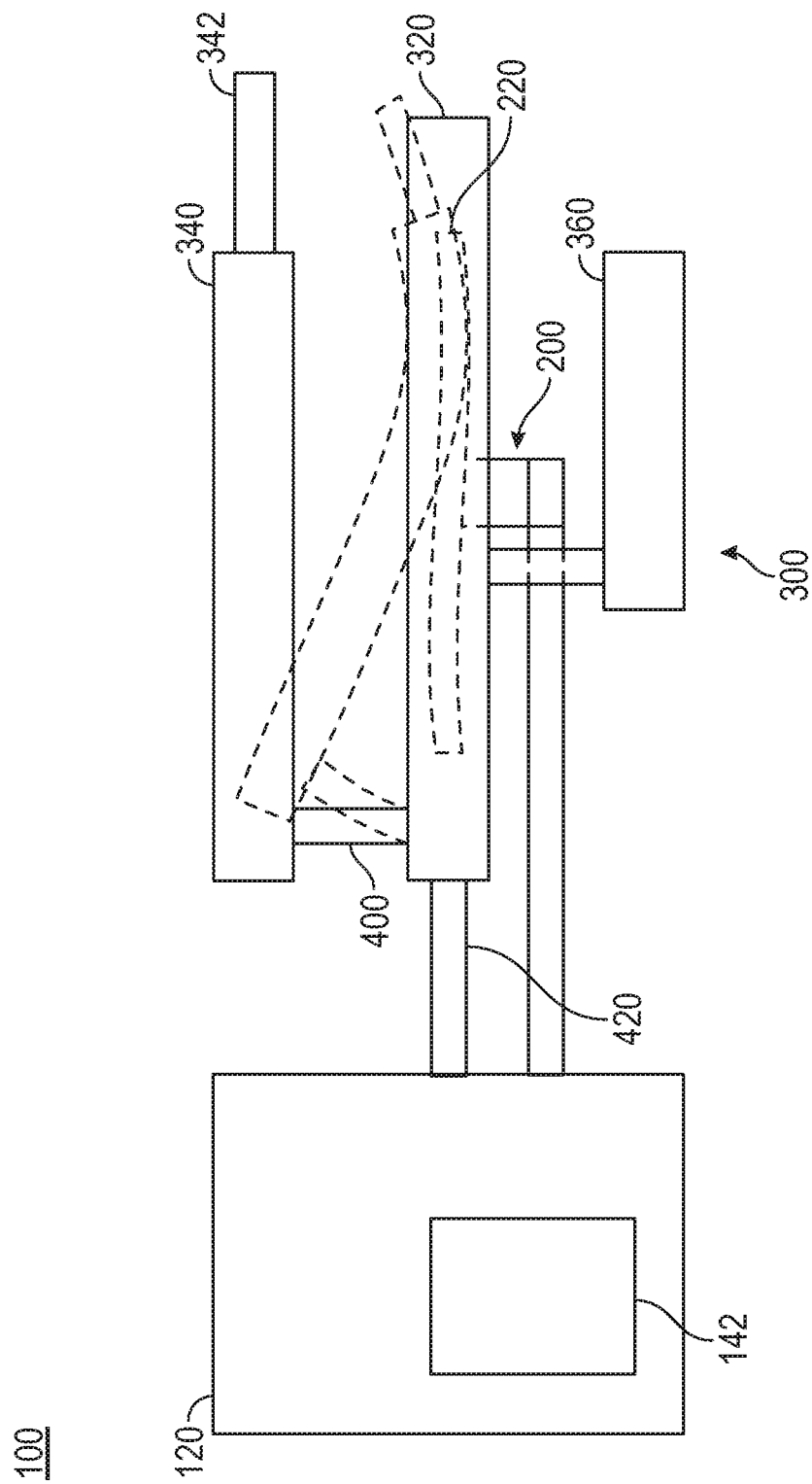
FIG. 1 illustrates a general block diagram of a side view of a propeller guard of an unmanned aerial vehicle (UAV) according to an embodiment of the invention.
Figure 2:
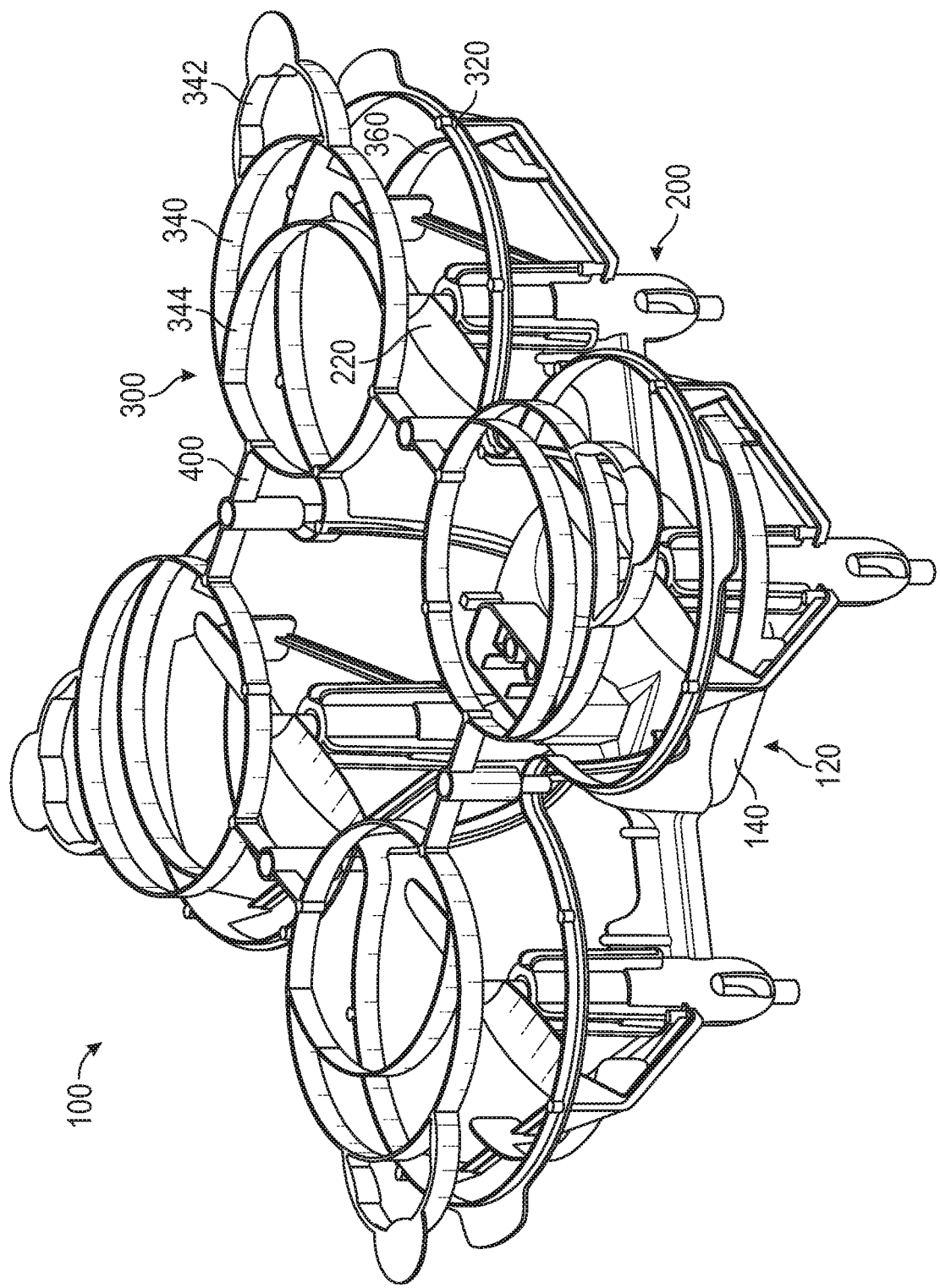
FIG. 2 illustrates a top perspective view of a UAV according to another embodiment of the invention.

The UAVs described herein include toy aerial vehicles such as remote controlled drones, planes, helicopters, quadcopters, and multirotors. FIG. 1 provides a simplified block diagram of a side view of a propeller guard of an unmanned aerial vehicle (UAV) according to a general embodiment of the present invention. The UAV comprises a main body 120 and a propeller guard 300 connected to the body 120. The propeller guard 300 includes a main guard 320, a movable guard 340, and an ancillary guard 360. The movable guard 340 and ancillary guard 360 are connected to and vertically displaced from the main guard 320 on opposite sides. The movable guard 340 is in a default position parallel to the main guard 320. The ancillary guard 360 is also parallel to the main guard 320.

Referring now to FIGS. 2-5, a UAV in accordance with an example embodiment of the present invention is shown. Though the UAV 100 shown in this specific embodiment is a quadcopter having four groups of rotors and respective propeller guards (see, e.g. FIG. 2), it is understood that the present invention is generally directed to a UAV with at least one rotor. The size and position of the rotor(s) and propeller guard(s) may be configured and adjusted depending on the desired aerodynamics, appearance, dimensions, flight characteristics, etc., of the UAV.

Figure 3:
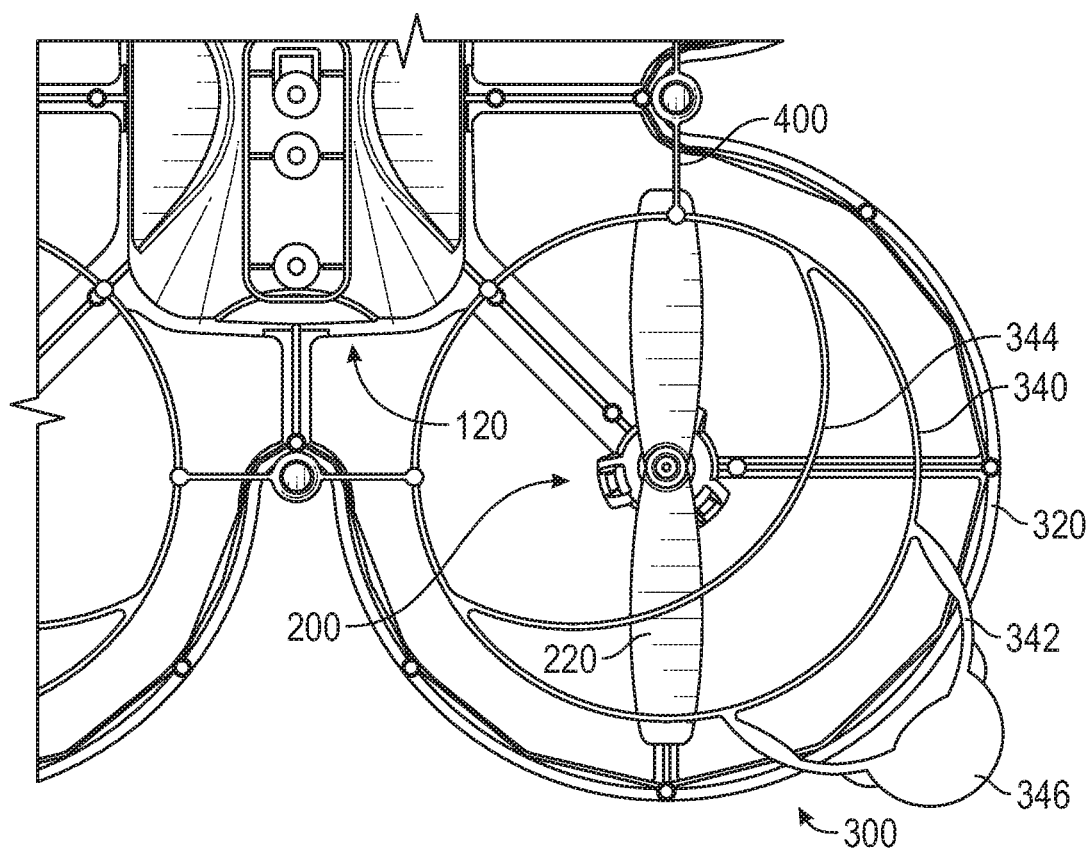
FIG. 3 illustrates a top view of a rotor and propeller guard portion of the UAV of FIG. 2.
Figure 4:
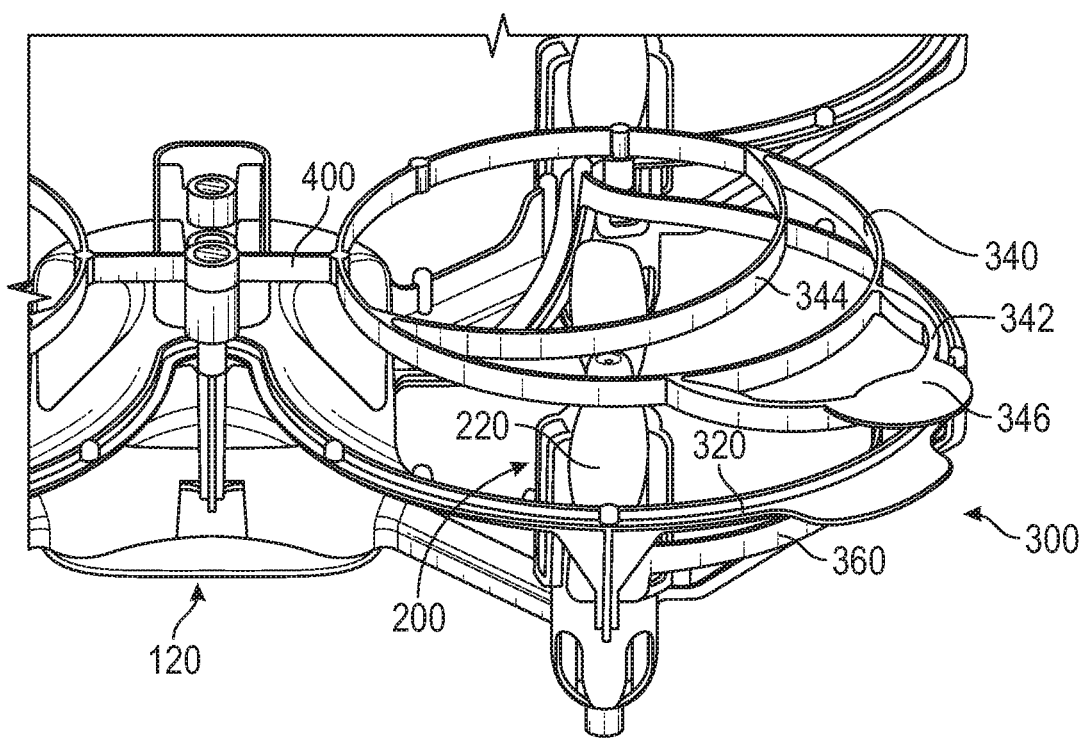
FIG. 4 illustrates a top perspective view of the rotor and propeller guard portion of the UAV of FIG. 2.
Figure 5:
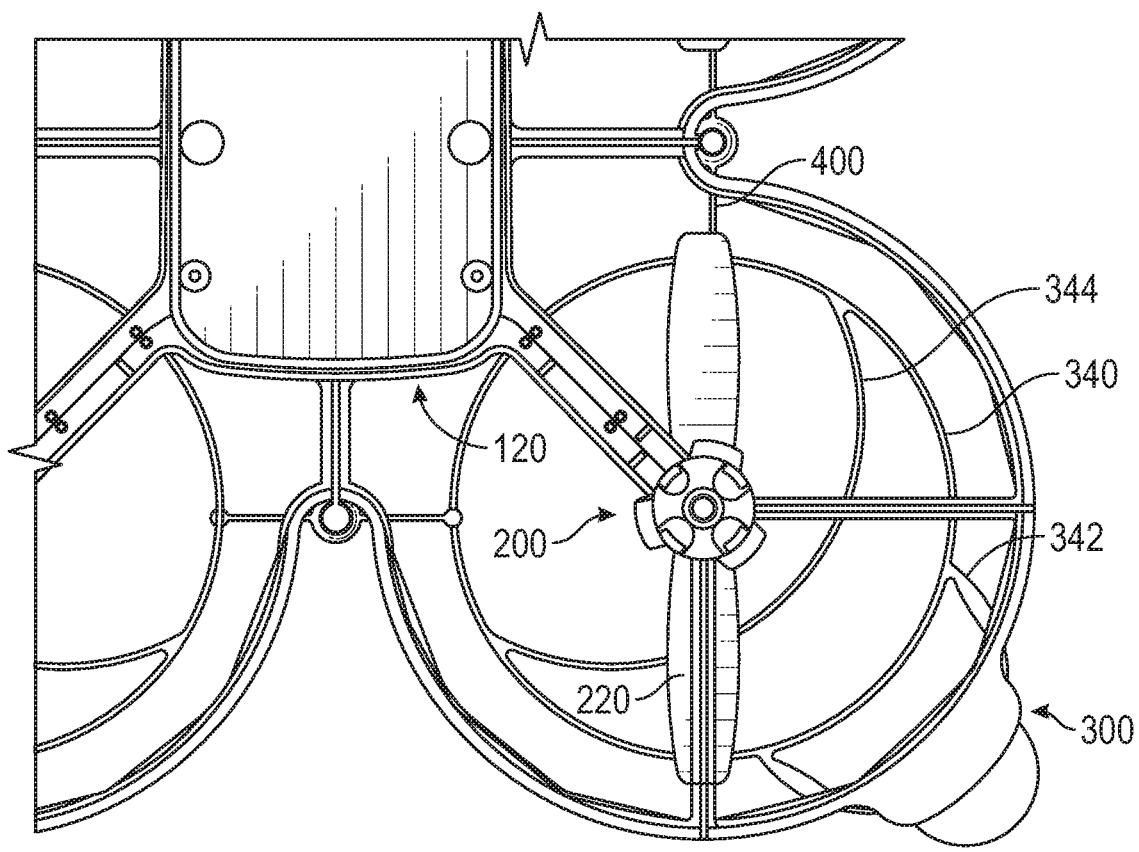
FIG. 5 illustrates a bottom view of the rotor and propeller guard portion of the UAV of FIG. 2.

FIGS. 3-5 provide a closer view of one of the rotors and propeller guards. In this particular embodiment, rotor 200 includes two propeller blades 220. It is understood that the rotor can have a different number of propeller blades (for example 1, 3 or 4 propeller blades) depending on the desired appearance, size, weight, speed of rotation, thrust generated, etc., of the rotor.

A propeller guard 300 surrounds the rotor 200. The propeller guard 300 includes a main guard 320 that surrounds the two propeller blades 220. In the illustrated embodiment, the main guard 320 is in a plane substantially parallel to, but vertically displaced from, the two propeller blades 220. In other embodiments, the main guard 320 is substantially co-planar to the two propeller blades 220. The propeller guard 300 also includes a movable guard 340 vertically displaced above the main guard 320 (see, e.g. FIG. 4). Embodiments of the present invention also include movable guards 340 in other positions vertically displaced from the main guard 320. For example, in other embodiments, the movable guard 340 is vertically displaced below the main guard 320. In all of these embodiments, the movable guard 340 is able to move from a default position that allows the propeller blades 220 to freely rotate, to an engaged position that contacts and obstructs the propeller blades 220 from rotating.

As shown in the example embodiment depicted in FIGS. 2-5, the movable guard 340 includes a loop 342. The loop 342 helps prevent the movable guard 340 from becoming entangled with the propeller blade 220 when the movable guard 340 moves into an engaged position and contacts the propeller blade 220. As the movable guard 340 moves into an engaged position, the loop 342 abuts the main guard 320 and becomes an impediment that helps prevent the movable guard 340 from moving too far into the main guard 320 and underneath the propeller blade 220, where it might become stuck or entangled with the propeller blade 220. In some embodiments, the loop 342 includes an extension 346 that further helps prevent the movable guard 340 from moving too far into the main guard 320. In one instance, the extension 346 is a semicircular tab that also abuts the main guard 320 when the moveable guard 340 moves into the main guard 320. The loop 342 may also be reinforced or strengthened against bending by increasing the thickness of a portion or certain portions of the loop 342. In yet other embodiments, the movable guard 340 does not have a loop 342 (see, e.g. FIG. 8B).

Figure 9:
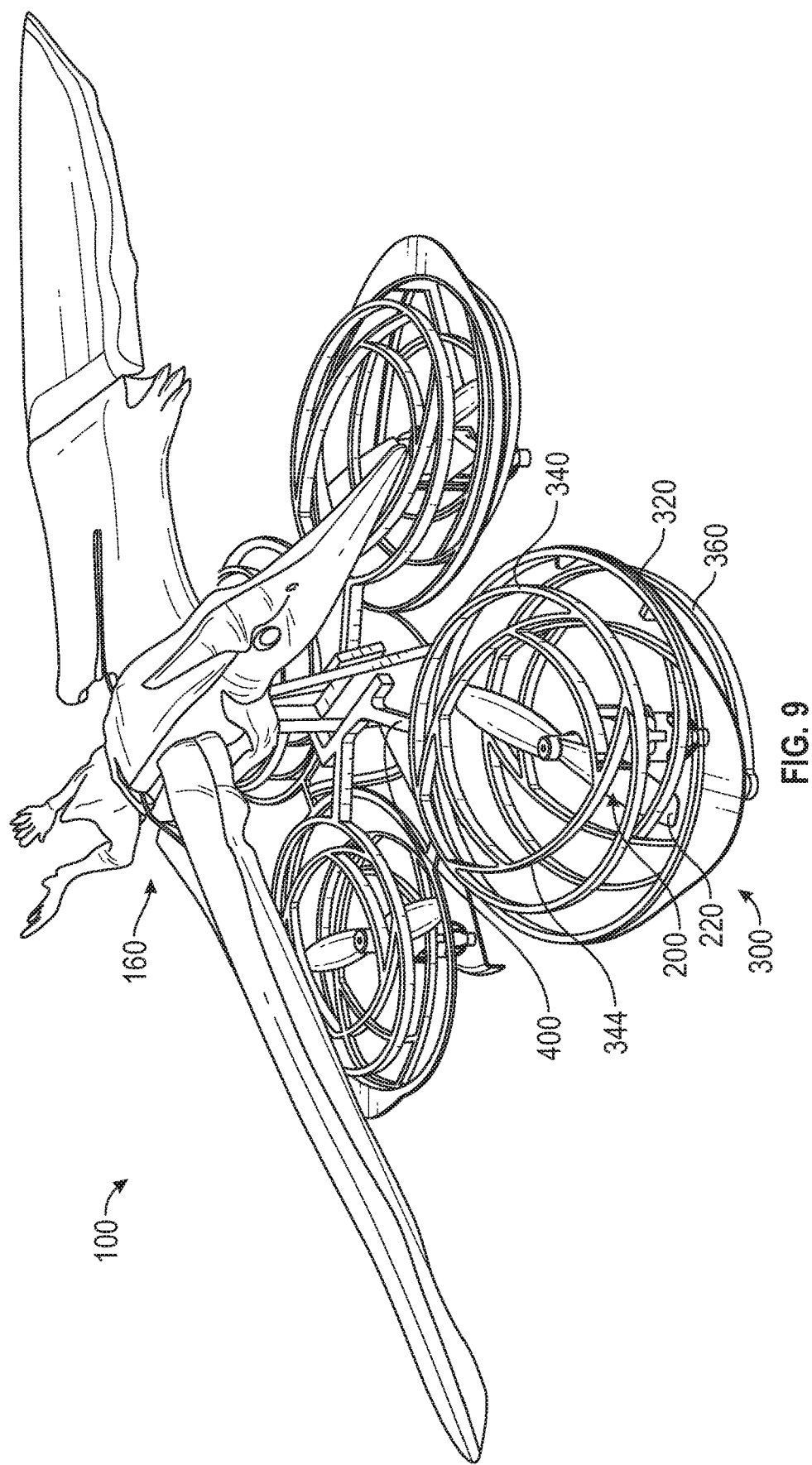
FIG. 9 illustrates a front perspective view of a UAV in accordance with another embodiment of the invention.

Certain embodiments of the movable guard 340 also include a protection strip 344 (see, e.g. FIGS. 2-5). This protection strip 344 provides additional protection that prevents and makes it harder for a user to contact the propeller blade 220. Any number of protection strips 344 may be incorporated depending on the desired level of protection. However, additional protection strips also increase the weight of the UAV 100. FIG. 9 shows an example of a plurality of protection strips 344 interlaced to significantly reduce the size of the openings in which an object (such as a finger of a user) can pass through the movable guard 340 and contact the propeller blade 220.

As shown in FIGS. 3-5, the propeller guard 300 also includes an ancillary guard 360 vertically displaced below the main guard 320. The ancillary guard 360 provides additional protection against contacting the propeller blades 220 from below the main guard 320. The ancillary guard 360 also facilitates deformation of the movable guard 340 when a user grabs and/or holds onto the propeller guard 300 (see, e.g. FIG. 7). Embodiments of the present invention also include ancillary guards 360 in other positions vertically displaced from the main guard 320 and positioned on a side of the main guard 320 opposite from the position of the movable guard 340. For example, in other embodiments, the positions of the ancillary guard 360 and the movable guard 340 in FIGS. 3-5 are switched such that the ancillary guard 360 is vertically displaced above the main guard 320 while the movable guard 340 is positioned below the main guard 320. In yet other embodiments, the propeller guard 300 does not include an ancillary guard 360.

Figure 8A:
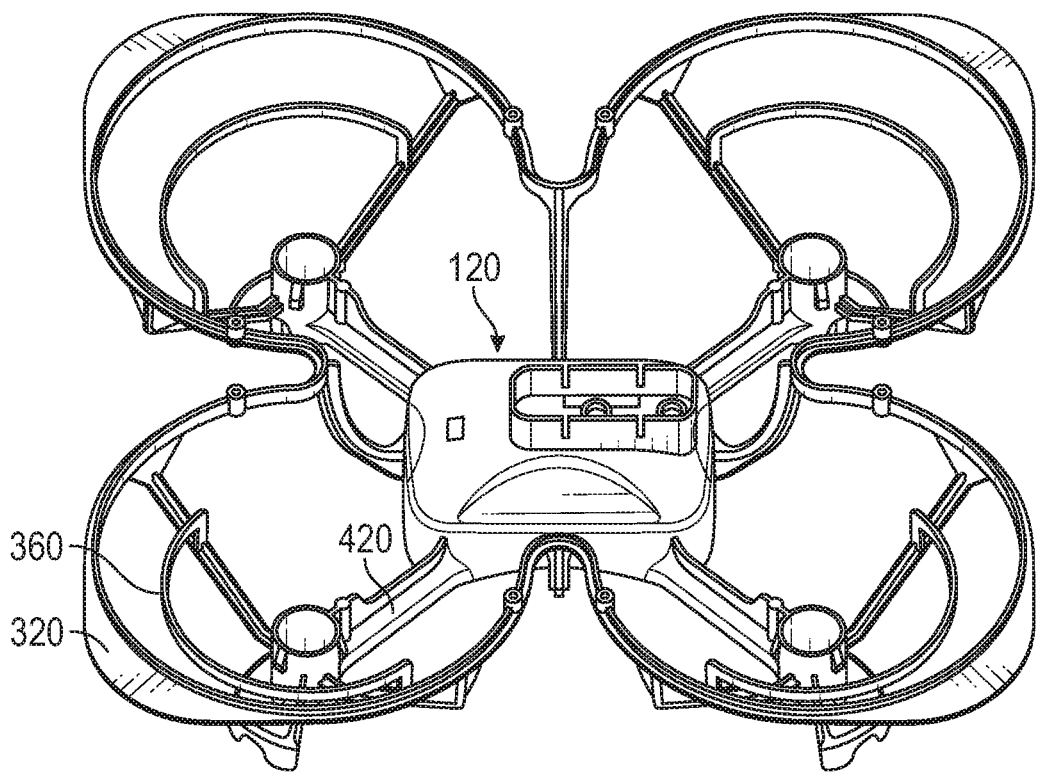
FIGS. 8A-8C illustrate top perspective views of a portion of a UAV and a plurality of propeller guards.
Figure 10:
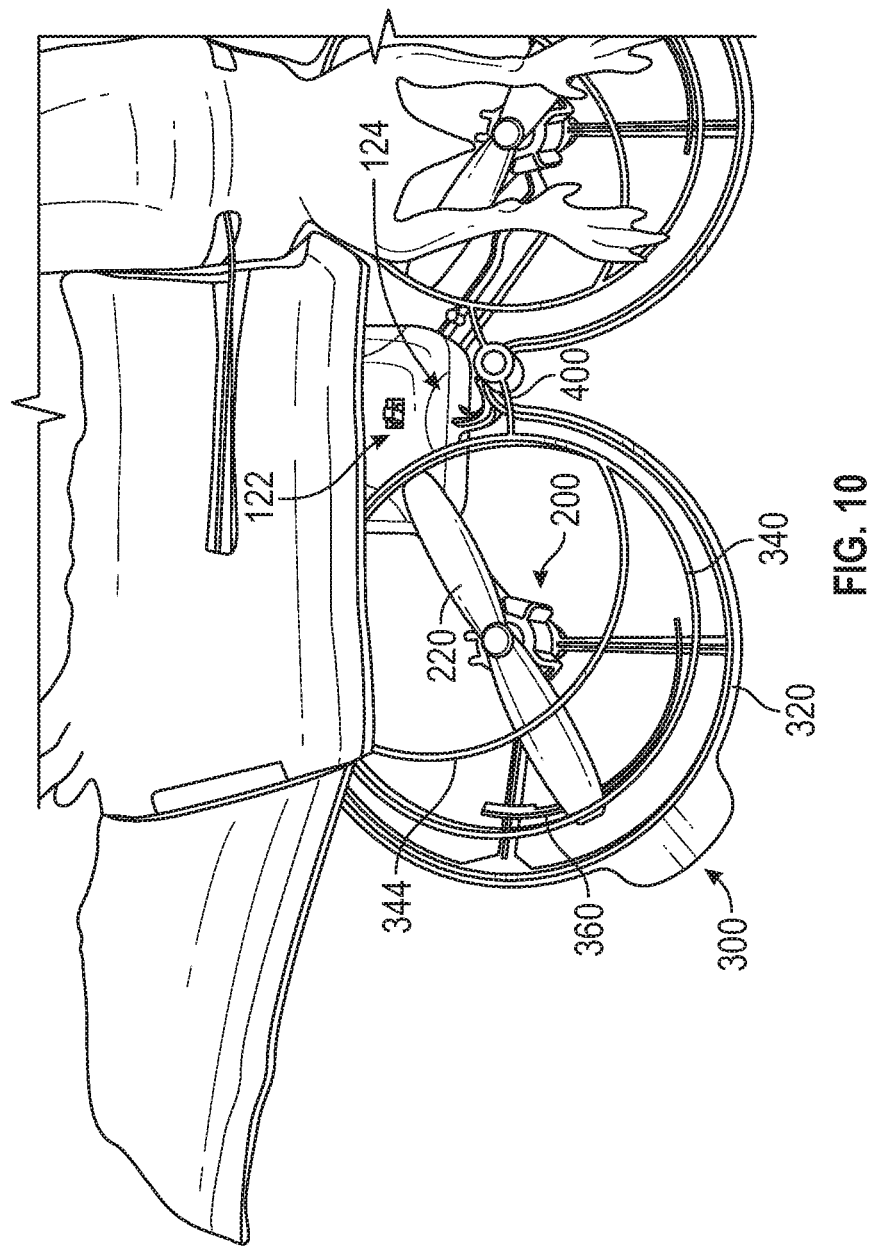
FIG. 10 illustrates a top view of a rotor and propeller guard portion of a UAV in accordance with another embodiment of the invention.

Due to the circular area covered by the propeller blades 220 when rotating, the main guard 320, movable guard 340, and/or ancillary guard 360 is typically a ring structure or a section of a ring structure. The section can be a semicircle, major arc or minor arc. For example, FIGS. 3-5 show an embodiment where the main guard 320 is a major arc section of a ring structure. Movable guard 340 is full ring structure, while the ancillary guard 360 is a minor arc section of a ring structure. Furthermore, FIGS. 8A and 10 show other embodiments where the ancillary guard 360 is a minor arc of different central angles. FIG. 9 shows another embodiment where the ancillary guard 360 is a full ring structure. Additionally, it is understood that the main guard 320, movable guard 340, and/or ancillary guard 360 can also be any other shape (e.g. rectangular, triangular).

Typically, the main guard 320, movable guard 340, and ancillary guard 360 are concentric, or at least concentric about a common axis. In the example embodiment shown in FIGS. 3-5, the main guard 320, movable guard 340, and ancillary guard are concentric with the rotor 200 positioned within the main guard 320 along the common axis. In the depicted configuration, the radius of the main guard 320 is greater than the length of the propeller blade 220, but the radii of the movable guard 340 and ancillary guard 360 are slightly less than the length of the propeller blade 220. This helps reduce the size of the openings in which an object (such as a finger of a user) can pass through to contact the propeller blade 220. In other embodiments, the radius of the movable guard 340 and/or ancillary guard 360 is approximately the same as the main guard 320.

Figure 6:
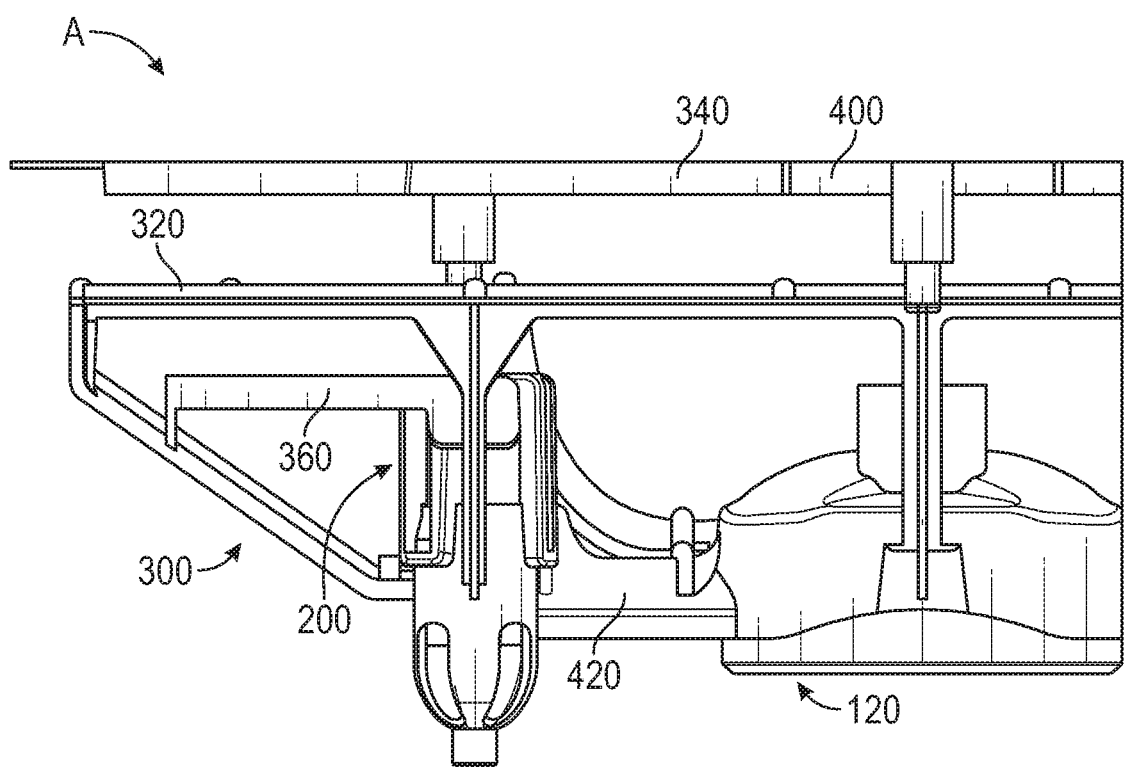
FIG. 6 illustrates a side view of the rotor and propeller guard portion of the UAV of FIG. 2 wherein the movable guard is in a default position.
Figure 7:
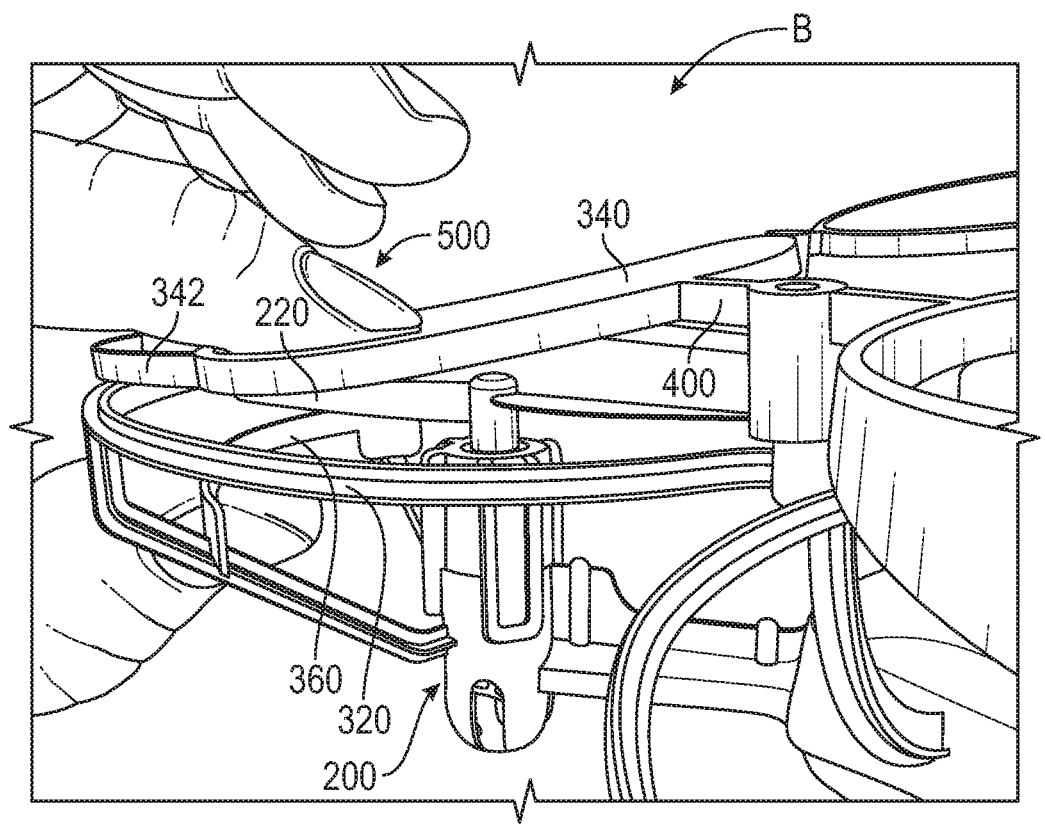
FIG. 7 illustrates the side view of the rotor and propeller guard portion of the UAV of FIG. 2 wherein the movable guard is in an engaged position.

FIGS. 6 and 7 show an example embodiment where the movable guard 340 is in a default position A and an engaged position B, respectively. FIG. 6 shows a main guard 320 that is substantially parallel to a plane of rotation of the propeller blades 220 and a movable guard 340 that is substantially parallel to the main guard 320. Though the main guard 320 is approximately coplanar to the propeller blades 220 in the depicted embodiment, the main guard 320 can also be positioned above or below the propeller blades 220. Further, it is understood that as long as the default position A of the movable guard 340 allows the propeller blades to freely rotate, other embodiments of the present invention include a main guard 320 and/or movable guard 340 that is not parallel to the plane of rotation of the propeller blades 220.

FIG. 7 shows the movable guard 340 moved by a user 500 to an engaged position B. In the depicted embodiment, user 500 performs a pinching action on the propeller guard 300. A downward force is provided by a finger on the movable guard 340 and an opposite upward force is provided by another finger on the ancillary guard 360. As described in further detail herein, the movable guard 340 is made of a flexible material that allows the movable guard 340 to be temporarily bent downwards toward the main guard 320 and propeller blades 220. The ancillary guard 360 is made of a relatively more rigid material that facilitates the user in temporarily deforming the movable guard 340 while preventing the user from contacting the propeller blades 220 from below.

In this engaged position B, a section of the movable guard 340 intersects a plane defined by the main guard 320. By moving the movable guard 340 from the default position A to the engaged position B, the movable guard 340 comes into contact with one of the propeller blades 220. This contact results in the movable guard 340 obstructing the rotation of the propeller blades 220. In the depicted embodiment in FIG. 7, the propeller blade 220 is trapped between the movable guard 340 and ancillary guard 360 and is stopped from further rotating. This system reduces injuries that may occur when a user comes into contact with the UAV while its rotor is spinning at high speeds, even when the user attempts to grab, stop, and/or hold onto the UAV mid-flight. After the user releases the propeller guard 300 (i.e. when pressure is removed from the propeller guard 300), the movable guard 340 returns to the default position A.

Additionally, in some embodiments where the UAV comprises multiple rotors 200, a stall system 142 is included that controls and stops all the rotors 200 from rotating when at least one of the propeller guards 300 obstructs rotation of a rotor 200. This stops the UAV from flying and provides additional safety to the user that grabs and/or holds onto a propeller guard 300.

Figure 8B:
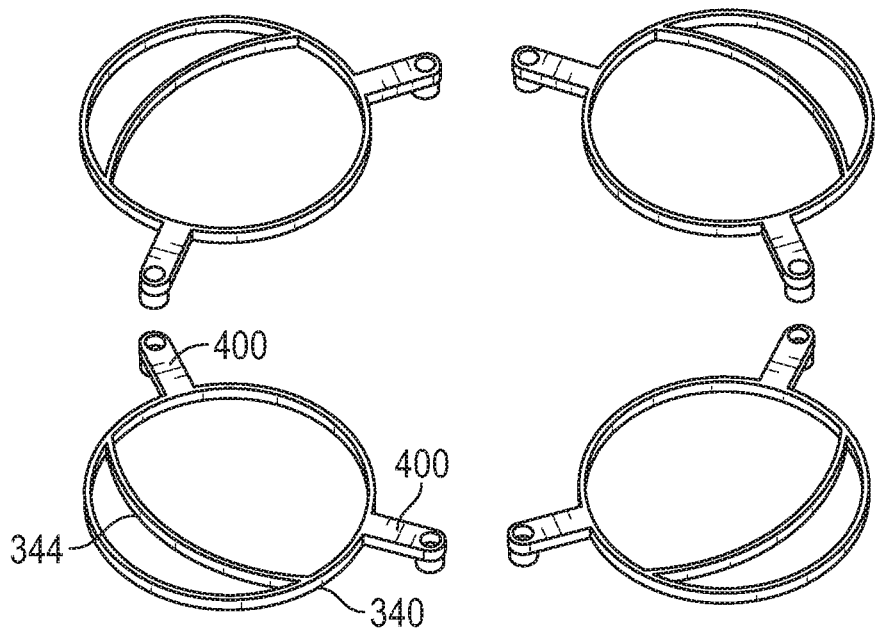
Figure 8C:
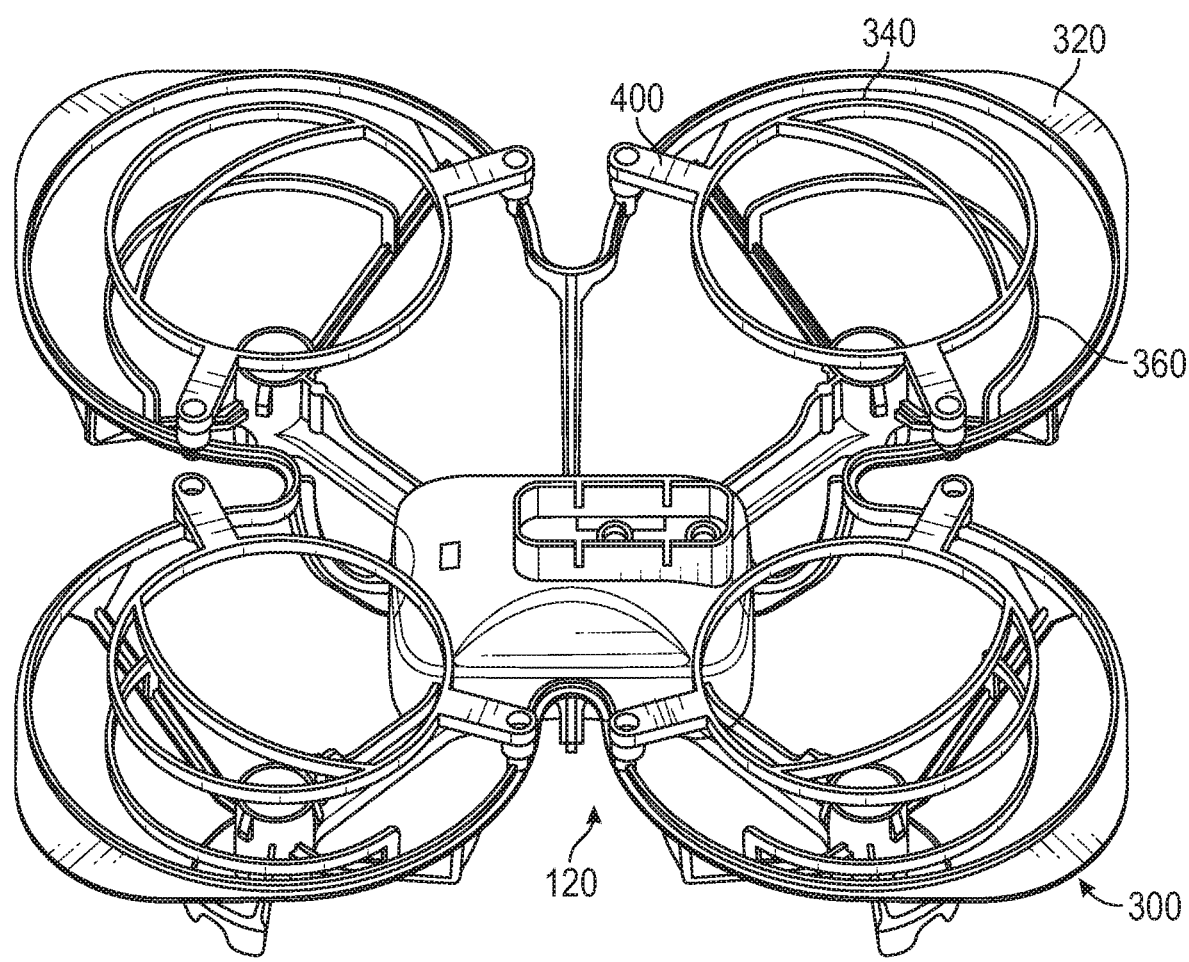

FIGS. 8A-8C show a portion of a UAV including four propeller guards 300. Each of the propeller guards 300 include a main guard 320, a movable guard 340, and an ancillary guard 360. As shown in FIG. 8A, a support beam 420 connects the main guard 320 to a body 120 of the UAV. The movable guard 340 has two linkages 400 that connect the movable guard 340 to the main guard 320 (see, e.g. FIGS. 8B and 8C). There is also no direct connection between the movable guard 340 and the UAV body 120. It is understood that other embodiments include a different number of linkages 400. The movable guard 340 can also be directly connected to the UAV body 120. For example, FIG. 9 shows a single linkage 400 that directly connects the movable guard 340 to the UAV body 120.

Typically, the movable guard 340 and/or linkage 400 is made of a flexible material that can be temporarily deformed, which includes bending or changing the shape of the movable guard 340 or linkage 400. More specifically, the flexible material has an elastic property that allows the movable guard 340 to be moved from a default position A to an engaged position B when a force is applied on the movable guard 340 by a user and subsequently return back to its default position A when the force is removed. In some examples, the flexible material is a plastic, such as acrylonitrile butadiene styrene (ABS) or nylon. In the example embodiment shown in FIGS. 8A-C, both the movable guard 340 and two linkages 400 are made of a flexible material that can be temporarily deformed. When force is applied on the movable guard 340, both the movable guard 340 and linkages 400 are temporarily deformed (see, e.g. FIG. 7 where the movable guard 340 and linkages 400 are bent downwards towards the main guard 320). When the force on the movable guard 340 is removed, the flexible material of the movable guard 340 and linkages 400 return to their original shape, which thereby causes the movable guard 340 to return to its default position A (see, e.g. FIG. 6).

In some embodiments, only a portion of the movable guard 340 and/or linkage 400 is temporarily deformable. In such instances, when force is applied on the movable guard 340, only the flexible portion of the movable guard 340 and/or linkage 400 temporarily deforms, thereby functioning similarly to a hinge. In still other embodiments, the flexible portion of the movable guard 340 and/or linkage 400 includes an elastic structure such as a spring.

Figure 11:
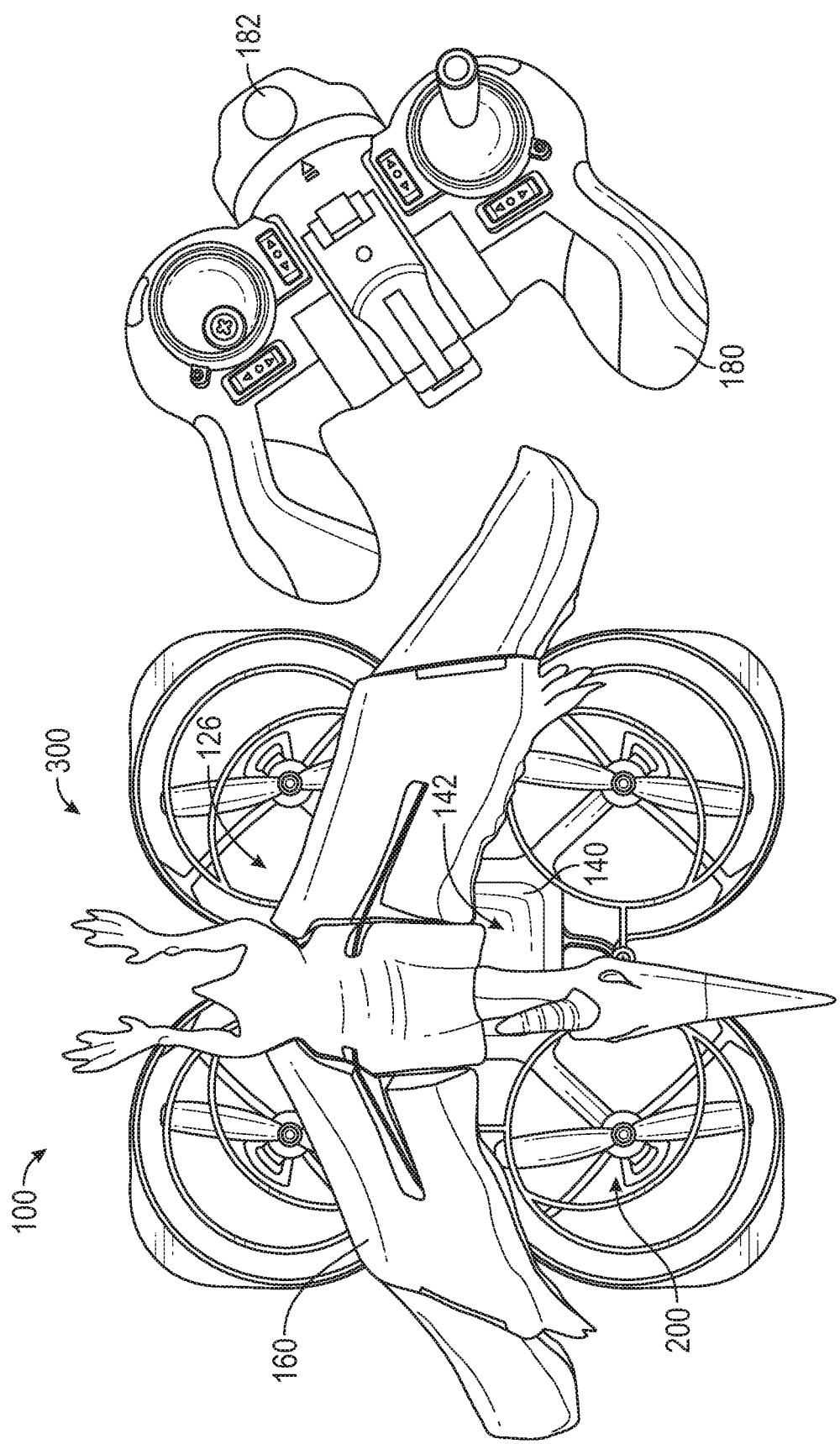
FIG. 11 illustrates a top view of a UAV including a remote control in accordance with another embodiment of the invention.
Figure 12A:
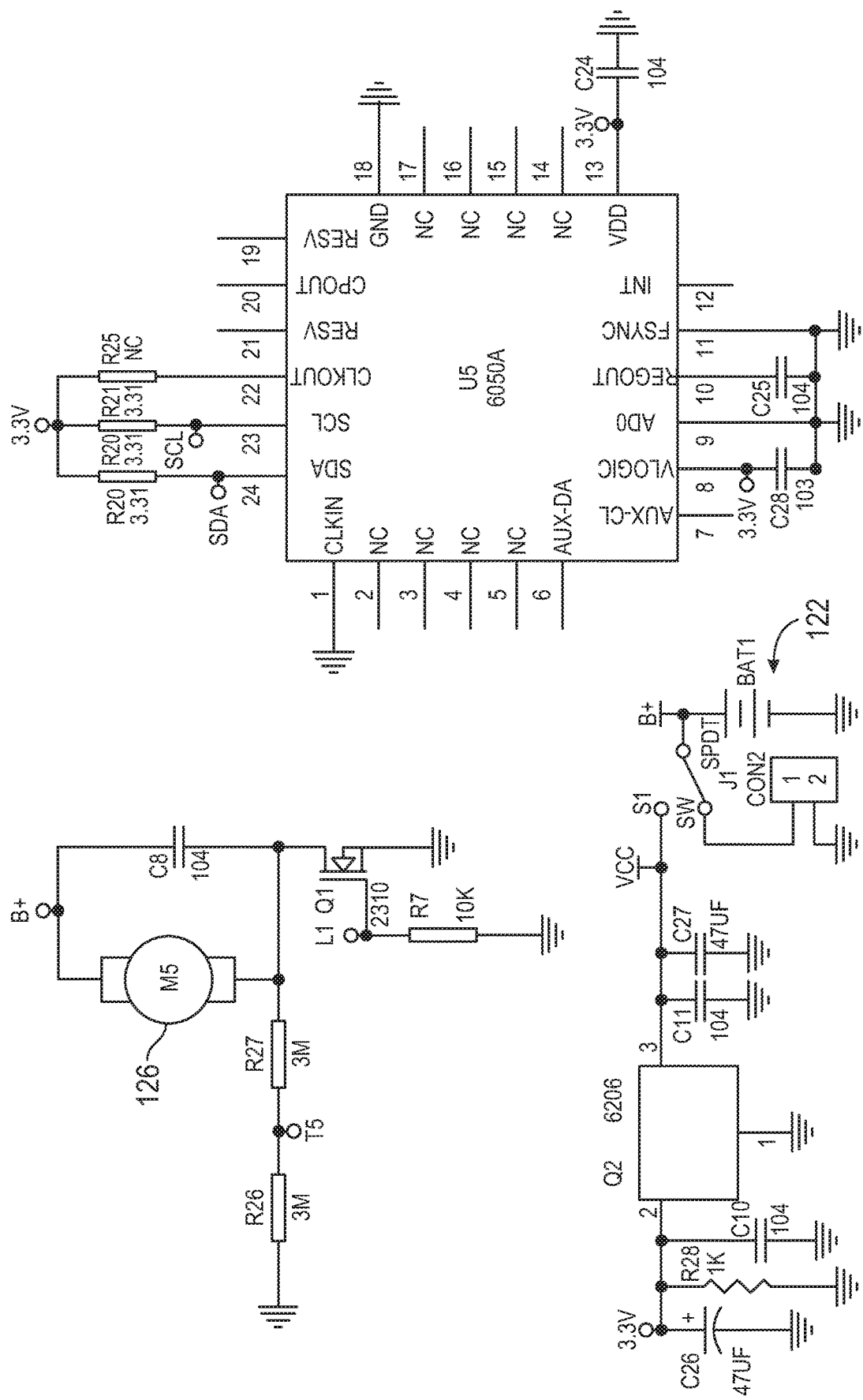
FIGS. 12A-12D illustrate an electronics schematic of a control system for the UAV of FIG. 2.
Figure 12B:
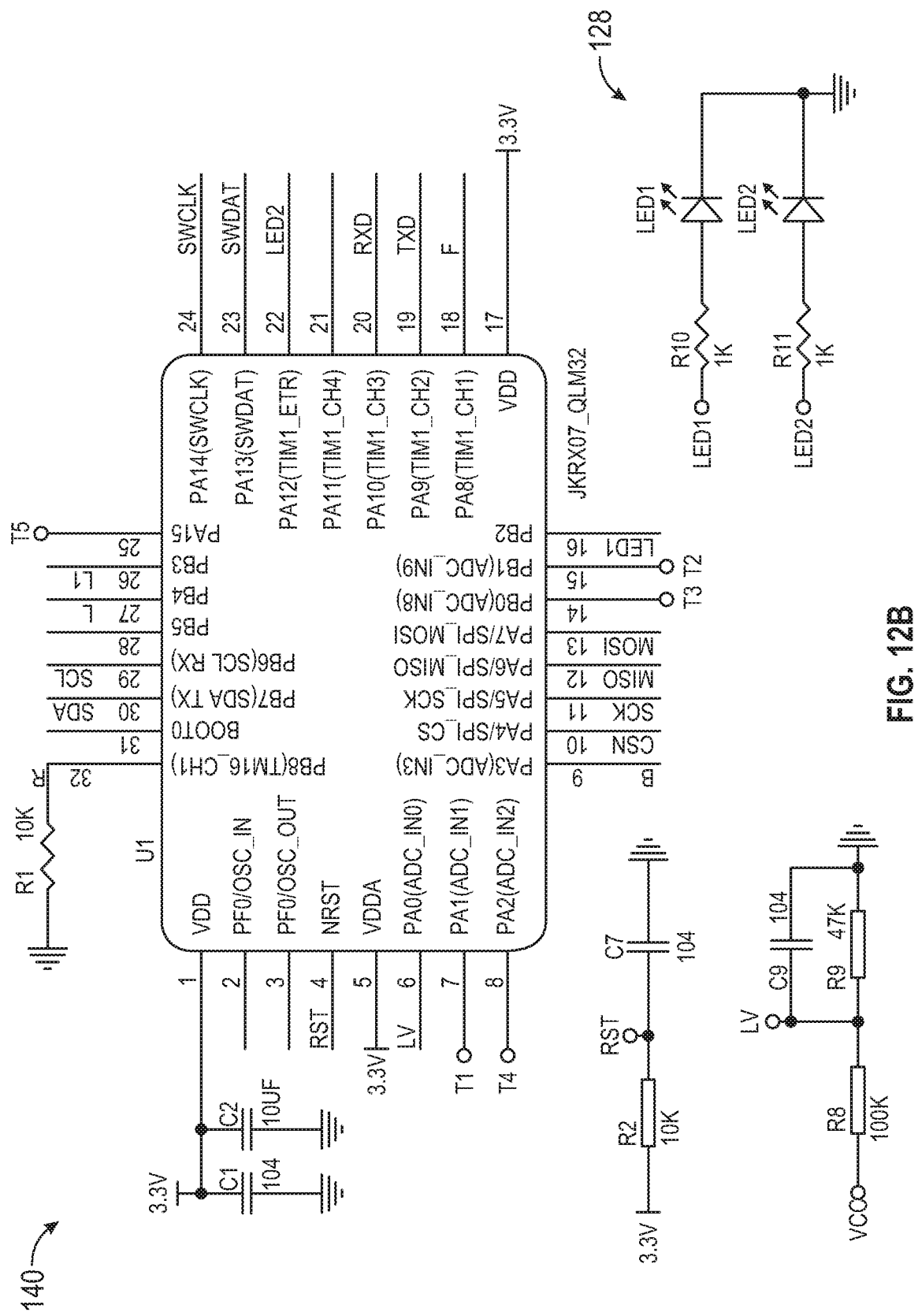
Figure 12C:
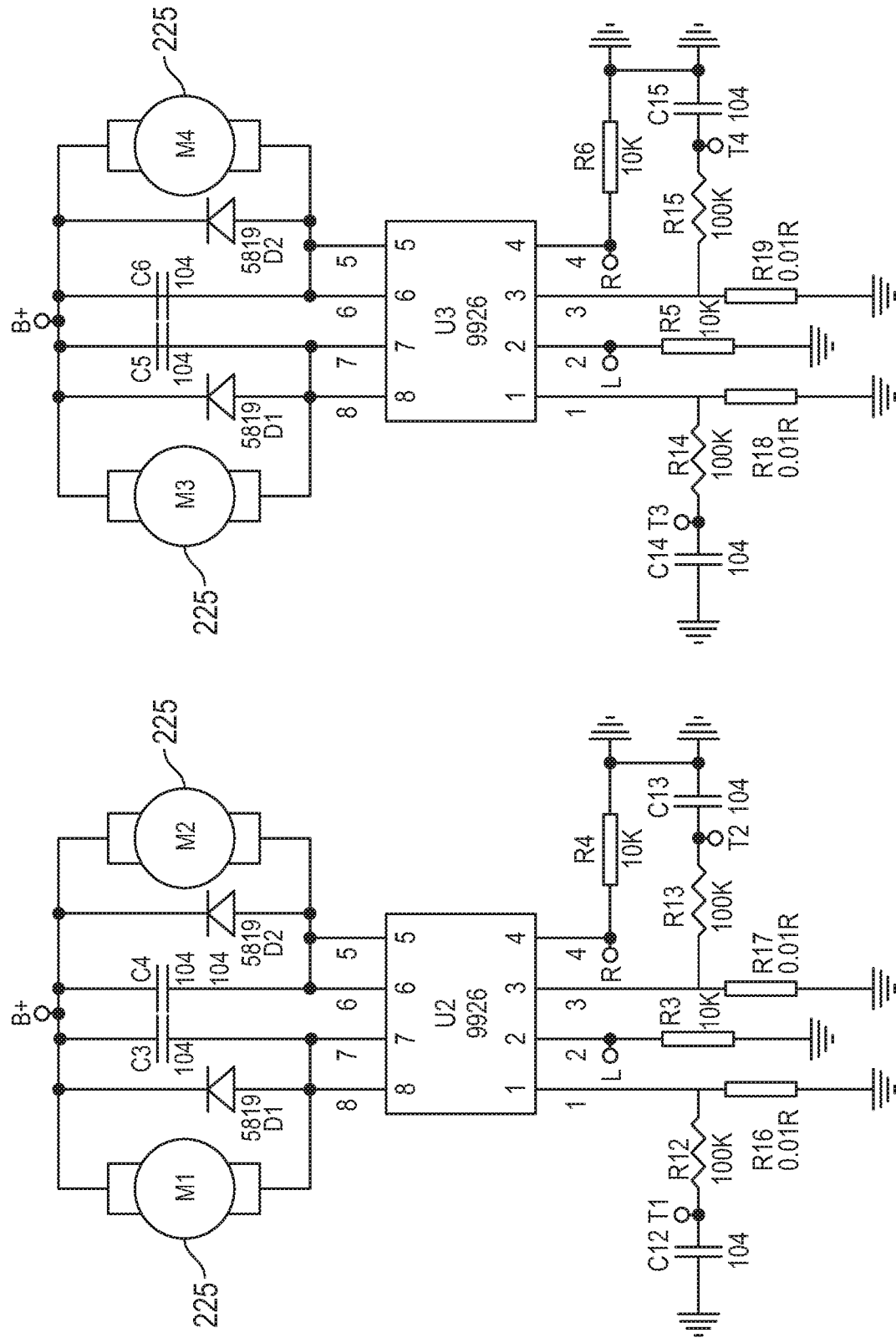
Figure 12D:
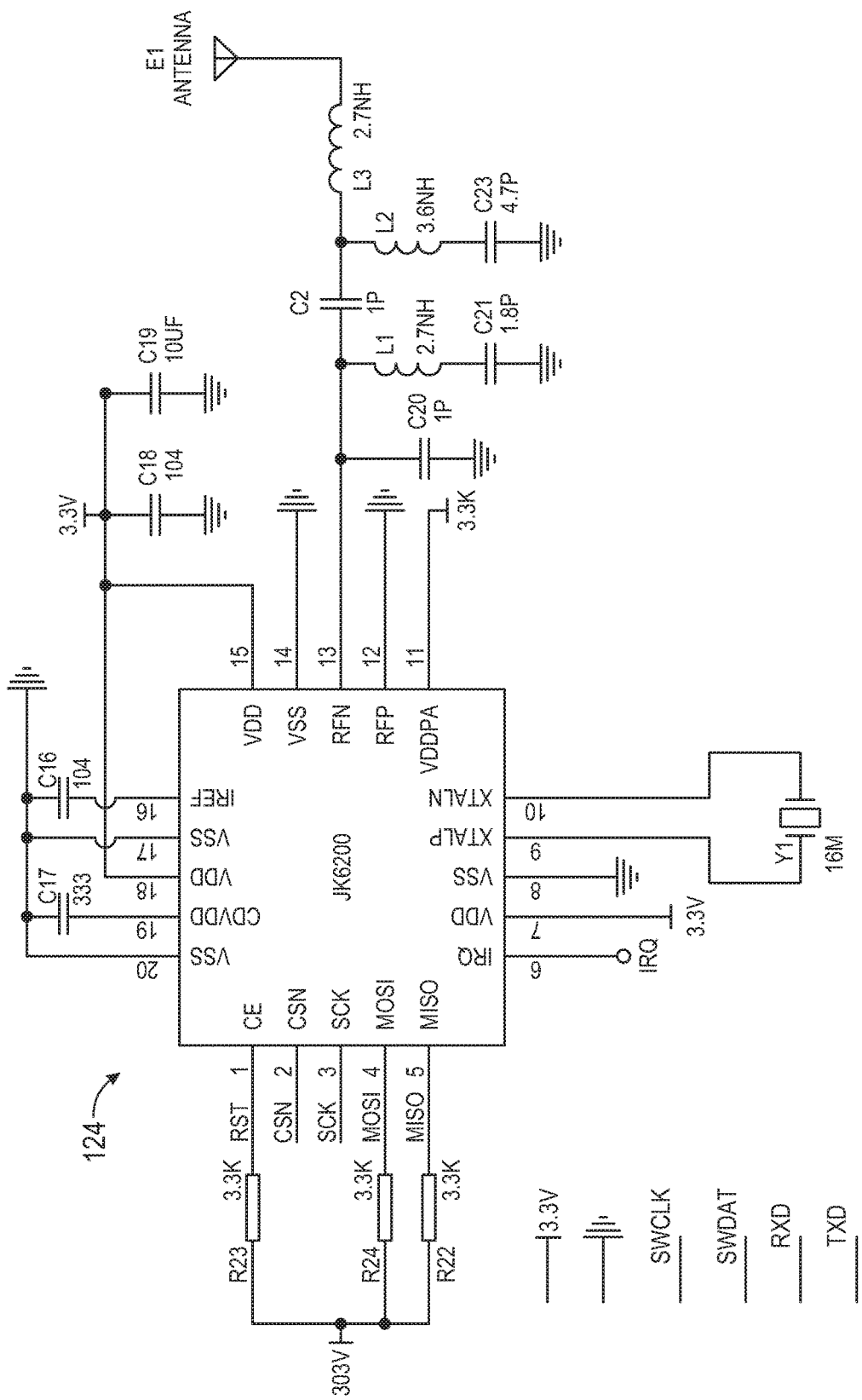

In addition to the components described above (e.g. propeller guard 300, rotor 200, propeller blades 220, UAV body 120), embodiments of the UAV typically include components such as a remote control 180, control system or processor 140, and power source 122 (see, e.g. FIGS. 10 and 11). Generally, to operate the UAV, a remote control 180 is used to control remotely, for example, the speed, direction, takeoff, landing, and flight pattern of the UAV. The remote control 180 includes a transmitter 182, which sends a signal that is received by a receiver 124 on the UAV body. The received signal is then processed by a control system or processor 140 which controls the UAV accordingly, such as by adjusting the speed and/or direction of rotation of one or more rotors 200. A power source 122 (e.g. batteries) is used to provide the power necessary to operate the UAV 100. LED lights 128 may also be included to indicate when the power source 122 has sufficient power or when a connection is made between the transmitter 184 and receiver 124.

FIGS. 12A-12D show example electronics schematics of a control system 140 for a UAV. In some embodiments, the control system 140 is also programmed to receive feedback when one or more rotors 200 has been stopped from rotating (such as in situations where the rotor is obstructed by the movable guard) and subsequently stop the rotation of all the rotors 200. Note that motors 225 (see FIG. 12C) power the rotors 200 to spin the propeller blades 220. In other embodiments, the control system 140 is programmed with preset flight patterns that a user can easily execute, for example by pressing a button on the remote control 180. Examples of present flight patterns include having the UAV 100 circle at a predetermined radius in the air, taking off from the ground, and landing on the ground. Some embodiments of the UAV 100 include additional sensors that provide various feedback and information about the environment and/or the UAV which can be used by the control system 180 (for instance in obstacle detection and collision avoidance).

In one or more embodiments, an accessory with moving parts is attached to the body of the UAV. For example, as shown in FIG. 11, a model of a pteranodon 160 is attached to the UAV body 120. A motor 126 (see FIG. 12A) powered by the UAV power source 122 causes the wings of the pteranodon model 160 to move.

CONCLUSION

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims.

Moreover, it is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" may be used herein to describe an example or illustration. Any embodiment described herein as exemplary is not to be construed as a preferred or advantageous embodiment, but rather as one example or illustration of a possible embodiment of the invention.

Finally, various features from one of the embodiments may be incorporated into another of the embodiments. Accordingly, it is appropriate that the appended claims be construed broadly and in a manner consistent with the scope of the disclosure as set forth in the following claims.

The invention claimed is:

1. An unmanned aerial vehicle comprising a rotor having one or more propeller blades and a propeller guard surrounding the rotor, the propeller guard comprising:
   a main guard surrounding the one or more propeller blades, the main guard being connected to a body of the unmanned aerial vehicle by a support beam; and
   a movable guard vertically displaced from the main guard and supported by a linkage that connects the movable guard to the main guard to connect the movable guard to the body of the unmanned aerial vehicle, the movable guard being movable from a default position to an engaged position where a section of the movable guard intersects a plane defined by the main guard;
   wherein moving the movable guard from the default position to the engaged position results in the movable guard contacting and obstructing rotation of the one or more propeller blades.

2. The unmanned aerial vehicle of claim 1, wherein the movable guard returns to the default position when not in the engaged position.

3. The unmanned aerial vehicle of claim 1, wherein the main guard is substantially parallel to a plane of rotation of the one or more propeller blades.

4. The unmanned aerial vehicle of claim 1, wherein the movable guard is substantially parallel to the main guard when in the default position.

5. The unmanned aerial vehicle of claim 1, wherein at least one of the movable guard and the linkage is made of a flexible material, such that moving the movable guard to the engaged position comprises temporarily deforming at least one of the movable guard and the linkage.

6. The unmanned aerial vehicle of claim 5, wherein temporarily deforming the movable guard or the linkage includes bending at least a portion of the movable guard or the linkage.

7. The unmanned aerial vehicle of claim 1, wherein the propeller guard further comprises an ancillary guard vertically displaced from the main guard and positioned on a side of the main guard opposite from a position of the movable guard.

8. The unmanned aerial vehicle of claim 7, wherein at least one of the main guard, the movable guard, and the ancillary guard is a ring structure or a section of a ring structure.

9. The unmanned aerial vehicle of claim 8, wherein the main guard and the movable guard are concentric sections of first ring structures and a length of one propeller blade of the one or more propeller blades is less than a radius of the main guard and greater than a radius of the movable guard.

10. The unmanned aerial vehicle of claim 9, wherein the ancillary guard is a second ring structure or a section of a second ring structure having a radius less than the radius of the main guard.

11. The unmanned aerial vehicle of claim 1, wherein the unmanned aerial vehicle comprises a plurality of rotors and a plurality of propeller guards.

12. The unmanned aerial vehicle of claim 11, wherein the unmanned aerial vehicle further comprises a stall system that stops rotation of all the rotors when one or more of the plurality of propeller guards obstructs rotation of a respective rotor.

13. An unmanned aerial vehicle comprising a rotor having one or more propeller blades and a propeller guard surrounding the rotor, the propeller guard comprising:
a main guard surrounding the one or more propeller blades; and
a movable guard vertically displaced from the main guard and supported by a linkage that directly connects the movable guard to a body of the unmanned aerial vehicle, the movable guard being movable from a default position to an engaged position where a section of the movable guard intersects a plane defined by the main guard;
wherein moving the movable guard from the default position to the engaged position results in the movable guard contacting and obstructing rotation of the one or more propeller blades.

14. The unmanned aerial vehicle of claim 13, wherein the movable guard returns to the default position when not in the engaged position.

15. The unmanned aerial vehicle of claim 13, wherein the main guard is substantially parallel to a plane of rotation of the one or more propeller blades and the movable guard is substantially parallel to the main guard when in the default position.

16. The unmanned aerial vehicle of claim 13, wherein at least one of the movable guard and the linkage is made of a flexible material, such that moving the movable guard to the engaged position comprises temporarily deforming at least one of the movable guard and the linkage.

17. An unmanned aerial vehicle comprising a rotor having one or more propeller blades and a propeller guard surrounding the rotor, the propeller guard comprising:
a main guard surrounding the one or more propeller blades; and
a movable guard vertically displaced from the main guard and including a loop, the movable guard being movable from a default position to an engaged position where a section of the movable guard intersects a plane defined by the main guard;
wherein the loop contacts the main guard when the movable guard is moved from the default position to the engaged position; and
wherein moving the movable guard from the default position to the engaged position results in the movable guard contacting and obstructing rotation of the one or more propeller blades.

18. The unmanned aerial vehicle of claim 17, wherein the movable guard is supported by a linkage connected to a body of the unmanned aerial vehicle.

19. The unmanned aerial vehicle of claim 17, wherein the movable guard returns to the default position when not in the engaged position.

20. The unmanned aerial vehicle of claim 17, wherein the main guard is substantially parallel to a plane of rotation of the one or more propeller blades and the movable guard is substantially parallel to the main guard when in the default position.

* * * * *